(12) United States Patent
Steer

(10) Patent No.: US 6,845,246 B1
(45) Date of Patent: Jan. 18, 2005

(54) LOCATION BASED POWER CONTROL FOR MOBILE COMMUNICATIONS SYSTEMS

(75) Inventor: David G. Steer, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 755 days.

(21) Appl. No.: 09/593,698

(22) Filed: Jun. 15, 2000

(51) Int. Cl.[7] .......................... H04Q 7/20; H04B 1/00; H04B 7/00
(52) U.S. Cl. ...................... 455/522; 455/69; 455/456.1; 370/318
(58) Field of Search .............................. 455/522, 456.1, 455/457, 63, 68, 70, 422, 69; 370/317, 318

(56) References Cited

U.S. PATENT DOCUMENTS

| | | | | |
|---|---|---|---|---|
| 5,943,610 A | * | 8/1999 | Endo | 455/69 |
| 6,006,096 A | * | 12/1999 | Trompower | 455/456 |
| 6,011,973 A | * | 1/2000 | Valentine et al. | 455/456.6 |
| 6,085,096 A | * | 7/2000 | Nakamura | 455/456.6 |
| 6,122,486 A | * | 9/2000 | Tanaka et al. | 455/68 |
| 6,188,883 B1 | * | 2/2001 | Takemura | 455/411 |
| 6,201,973 B1 | * | 3/2001 | Kowaguchi | 455/456.6 |
| 6,230,017 B1 | * | 5/2001 | Andersson et al. | 455/456.6 |
| 6,337,973 B1 | * | 1/2002 | Agin et al. | 455/69 |
| 6,343,212 B1 | * | 1/2002 | Weber et al. | 455/404.1 |
| 6,442,393 B1 | * | 8/2002 | Hogan | 455/456 |
| 6,490,460 B1 | * | 12/2002 | Soliman | 455/522 |
| 6,625,455 B1 | * | 9/2003 | Ariga | 455/565 |

FOREIGN PATENT DOCUMENTS

| | | | | |
|---|---|---|---|---|
| EP | 97401656.0 | | 7/1997 | H04Q/7/38 |
| EP | 99107677.9 | | 4/1999 | H04Q/7/32 |

* cited by examiner

Primary Examiner—Simon Nguyen
(74) Attorney, Agent, or Firm—Borden Ladner Gervais LLP; Dennis R. Haszko

(57) ABSTRACT

A method and apparatus for facilitating power control within mobile radio systems. The power control is a function of location of the mobile station. Power levels are mapped to a geographic grid and power levels are set based upon such pre-determined power levels. Alternatively, initial power levels are set based upon the mapped power levels, but are subject to fine tuning through a much reduced feedback loop.

3 Claims, 5 Drawing Sheets

LOCATION BASED POWER CONTROL FOR MOBILE COMMUNICATIONS SYSTEMS

BACKGROUND OF THE INVENTION

1. Field of the Invention

The present invention involves power control enhancement within mobile communications systems. Moreover, the present invention addresses problems associated with setting power levels. More specifically, the present invention defines a preferred method for setting the power based upon the geographical location of the mobile station.

2. Description of the Prior Art

Power control is key to the successful operation of radio access technology such as Code Division Multiple Access (CDMA). CDMA systems rely on strict control of power at the mobile station to overcome the "near-far problem" that occurs when the interfering signal is significantly stronger than the desired signal and such an interfering signal would then jam the weaker signal. If the signal from a mobile station were to be received at the cell site receiver with too much power, that particular mobile station would then overload that receiver. This would overwhelm the signals from the other mobile stations. The goal of CDMA is to have the signals of all mobile stations arrive at the base station with as exactly similar power as possible. The closer the mobile station is to the cell site receiver, the lower the power necessary for transmission. On the other hand, the further away the mobile station, the greater the power necessary for transmission. Accordingly, two forms of adaptive power control are typically employed in CDMA systems. These include open-loop and closed-loop power control.

Open-loop power control is based on the similarity of loss in the forward and reverse paths. The received power at the mobile station is used as a reference. If it is low, the mobile station is assumed to be far from the base station and transmits with high power. If it is high, the mobile station is assumed to be near the base station and transmits with lower power.

Closed-loop power control is used to adjust the power from the mobile station from the open-loop setting. This adaptive process adjusts the power from the initial open-loop setting to match the power needed for the mobile's current location and the current radio propagation conditions. This is achieved by an active feedback system from the base station to the mobile station. As an example, power control bits may be sent every 1.25 ms to direct the mobile station to increase or decrease its transmitted power by 1 dB. Lack of power control to at least this accuracy greatly reduces the capacity of CDMA systems.

With these adaptive power control techniques, the mobile station transmits only enough power to maintain a link. This results in an average power requirement that is much lower than that for analog systems, which do not usually employ such techniques. CDMA's lower power requirement translates into smaller and lightweight mobile terminals, longer-life of batteries and makes possible, lower-cost handheld computers and wireless computercommunications devices.

Within mobile communications systems and especially such systems having high traffic, the radio power must be kept to the minimum necessary to maintain the desired error rate for the communications link. Using the lowest amount of radio power minimizes the interference to other calls and thereby maximizes the traffic-carrying capability of the radio system.

The total power required for a radio link in the typical terrestrial radio environment is a complicated statistical function of the environment and the distance as is known in the art. Thus the power cannot be directly calculated from the distance, as it is subject to additional losses. These are often summarized as "fading" and "shadowing." Fading is extra loss due to the combination at the receiver of reflected signals from the environment and the motion of the transmitter or receiver or objects in the environment. Shadowing is extra loss due to obstructions (e.g., buildings) between the transmitter and the receiver. Further details of radio propagation modeling can be found, for example, in Chapter two of Gordon L. Stuber's book "Principles of Mobile Communication" published by Kluwer Academic While fading loss may vary rapidly with time (due to movement of the mobile or objects in the environment), the shadowing loss is relatively constant with time and only varies (often abruptly) as the mobile moves into or out of the shadowed region. Because the radio channel conditions vary over time due to fading and shadowing, the radio power is typically adjusted with a feedback control loop (as mentioned above) between the transmitter and the receiver. In traditional systems, the transmitter and the receiver exchange signaling messages to adjust the power level to the minimum needed for the desired error ratio. Such requisite levels and ratios are found in the Telecommunications Industry Association (TIA) standards IS-95 or IS-2000. This signaling involves a two-way flow of information between the base station and mobile station in order to send the power control messages. However, this two-way flow is not always possible, particularly during call set-up and for one-way data flows prevalent in data transfer and signaling. In these latter cases, it would be advantageous to have another means of adjusting the power to the optimum level rather than the extensive open and closed loop control processes described above.

SUMMARY OF THE INVENTION

It is desirable to obviate or mitigate one or more of the above-identified disadvantages associated with setting power control in a mobile communications system. The present invention proposes a technique of setting the power based on the location of the mobile station. Such location based power control may be done with significantly reduced or eliminated need for the traditional feedback control loop processes. Accordingly, the present invention is valuable for one-way traffic flows and highly suitable for short burst transmissions that are not long enough for the control loop to lock such as for Internet Protocol (IP) or signaling data packets.

The present invention includes a method for location-based power control within a mobile communications system. The method includes determining a plurality of location data objects each being a geographical location that corresponds to a portion of a mobile communications coverage area; determining a plurality of power value data objects each being a nominal transmit power level that corresponds to one of the location data objects; storing, within a database used by a power control process, a map having a data structure that includes the plurality of location data objects and the plurality of power value data objects; adjusting a transmit power for a mobile station according to a location of the mobile station correlating to the data structure in the map; and updating the plurality of power value data objects.

The present invention includes a computer data signal embodied in a mobile radio system. The signal includes a source code segment for determining a location of a mobile station; a source code segment for determining a power value data object corresponding to the location of the mobile station; and a source code segment for setting a transmit power level of the mobile station according to the power value data object corresponding to the location of the mobile station.

The present invention includes a map for access by an application program being executed on a mobile communications system. The map including a data structure stored in the map, the data structure including information resident in a database used by the application program and including a plurality of location data objects each being a geographic location corresponding to a portion of a mobile radio coverage area. The application program can be a power control process of the mobile communications system and the data structure also includes a plurality of power value data objects. The power value data objects can each include a nominal transmit power level that corresponds to one of the location data objects. Each of the power value data objects can further include a received signal value and a statistical variance value that represents the standard deviation of the received signal value and a nominal transmit power level corresponding to the received signal value. Accordingly, the map stores location-based power control data for access by an application program being executed on a mobile communications system. This map information is used together with the location of the mobile to help set the radio transmission power level at initial call setup, for one way traffic flows or for other conditions in which closed loop power control techniques are not suitable.

In the present invention, the map database resides on either a network side of the mobile communications system or on a mobile side of the mobile communications system.

Alternatively, the location of the mobile station may provide useful information in a variety of operating scenarios. For instance, location information may be useful in handoffs at the boundaries of coverage between systems. This may occur, for example, at the boundary of territory between coverage of two adjacent operators, or at the boundary of the coverage of one system (e.g. a third generation system such as 3G-UTRAN) and another (e.g. GSM). The boundary may also be between Frequency Division Duplex mode (FDD) and Time Division Duplex (TDD) operating modes of the 3G-UTRAN (or other) system. As the location of the mobile is seen to approach the region boundary, negotiations can begin with the adjacent network or subsystem to effect a smooth handoff to the new system. This may be appropriate both for handoffs to like systems (e.g. ones utilizing the same air interface) as well as to alternate systems (those utilizing a different air interface). In this latter case, the location information can be especially helpful as it enables the mobile (and the adjacent network) to be alerted to look out for radio signals in the new mode. For example, this can be used for transitions from the 3G system to GSM (and vice-versa) and also between areas of wide area systems and indoor systems that may be part of the 3G-UTRAN deployment (e.g. FDD and TDD modes).

Furthermore, location information may be used at initial call set-up from mobiles near a system coverage boundary to assure the appropriate system operator picks up the call. As there is frequently considerable co-coverage at the service boundaries and operators are often constrained by regulation to accept traffic only from within their licensed territories, this is an important service application. With the availability of data and multi-media services in the third generation mobile systems, some calls may require considerable resources. A call may require, for example, signaling, speech and high data rate stream and packet services all at once. For such a mobile requesting a handoff, the network may, or may not, be fully able to accommodate all the service requirements at the new (target) base station. Information about the location of the mobile can be used to assure that the handoff is being set-up to the right base station (e.g. the one closest one to the mobile's path). The new call may also be partly accepted by a plurality of base stations that are nearby to the mobile's location, but are individually unable to accommodate the full requested services and can accommodate the service request in summation.

There are both radio communications to set-up, and also landline network channels needed to accommodate the variety of traffic. Packets may need to be re-routed and buffered at the target base station. This may require adjusting the existing traffic at the new base station. Traffic may be offloaded from other mobiles that are known to be in locations that can be serviced by other nearby base stations and thereby release resources for the handoff. Also, the mobile's traffic could be serviced by splitting it among several new base stations with complimentary coverage, rather than being forced exclusively to one new base station. This form of distributed resources handoff may also be used at call origination to spread the new load over several base stations and network connections. This is not possible without knowledge of the location of the mobile as one can't really be sure from the signal strength which of several alternate base stations might be suitable to share the traffic. More simply, if the base station initially selected to receive the call has insufficient resources to accommodate the additional call, then the location information can be used to defer or deflect the call set up or handoff to an alternate nearby base station to continue the call until the initial base station becomes available. This reduces the incidence of lost calls through traffic overloads.

Another use of location information is relevant to preventing fraudulent use of mobile phones, as it is an unfortunate aspect of network operations. The availability of location information, particularly at call origination time, can be used to help sort out the legitimate and illegitimate operation of a mobile unit. It may also be expected to reduce the usage of stolen phones if it becomes well known that they can be tracked when in use. This information may be passed to the law enforcement authorities for action, or to monitor movements.

While such varied use of location information of the mobile is possible, the present invention is focused on power control processes that utilize such location information. This focus is due to the fact that the radio power loss due to the path distance is the biggest component of the radio link budget. In an ideal system, simply using the base station closest to the mobile station ensures that minimum power is used for transmission. The transmission path loss may be approximately derived from information including the location of the mobile station, the location of the serving base station, and the computed distance between the two. Further, contemporary mobile communications systems include the standardized capability to determine the location of the mobile station—e.g., the Telecommunications Industry Association (TIA) standard IS-95 and the European Telecommunications Standards Institute (ETSI) standard for Global System for Mobile communications (GSM). The mobile station location may be determined by means of the given communications system's standard technique or alternatives such as the use of a navigation system like the Global Positioning System (GPS). It should be understood that the location of the mobile station may be determined by any suitable locating technique without straying from the intended scope of the present invention.

The present invention is in sharp contrast to the known straight-line distance approach or triangulation methodology that is more appropriate in ideal terrain (i.e., flat and open areas). According to the present invention, the radio power levels within the radio system are set via a map (or table). Such a map includes suitable power levels for locations within the coverage region regardless of terrain type. The map may be developed in several ways. One way would be for measurements to be made in a survey (e.g., when the network is installed). The survey results, in the form of a map or table, are stored in the power control processor (i.e., server) associated with the mobile network. Measurements would be made at practical locations in a roughly grid pattern throughout the coverage area.

Alternatively, a dynamically generated map can be created. In such a situation, the network of base stations would be installed and operated as is typical. As connections (i.e., successful calls) are made with mobile stations in normal use, the power levels used (normalized to standard bit rate and error rate) along with the related location information would be stored in the map. Over time, this technique would dynamically build up a map of power levels in the most utilized locations. This latter technique has the advantage that as the radio propagation conditions vary over time as the environment changes (e.g., new buildings are added . . . etc.), the map is automatically updated to the latest conditions. Moreover, it is advantageous to combine the initial survey map with the dynamic updating through usage such that implementing the invention is accomplished quickly and the benefits of the invention increase over time via the dynamic updating.

Together, the inventive techniques for using the location information for power control provide smoother and more accurate level control for packet and wide bandwidth services. This helps to deliver higher traffic capacity and revenues through the optimum allocation of network resources. Other aspects and features of the present invention will become apparent to those of ordinary skill in the art upon review of the following description of specific embodiments of the invention in conjunction with the accompanying figures.

DETAILED DESCRIPTION OF THE INVENTION

The present invention includes an apparatus and method using location information for power control. The inventive method is realized through system enhancements that store updated information to assist in rapidly setting power levels for any given geographical location. Such system enhancements are shown in FIG. 1.

Figure 1:
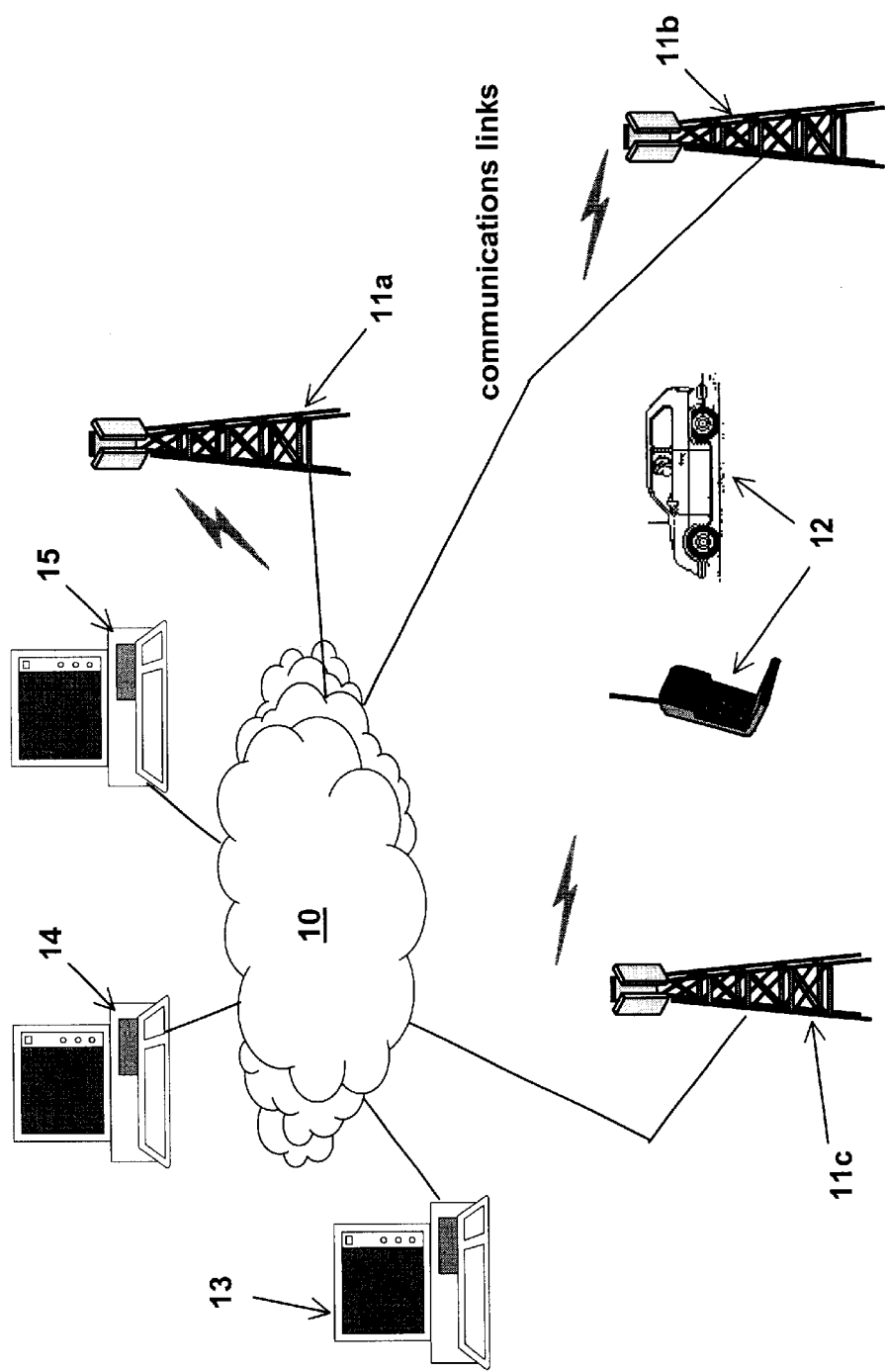
FIG. 1 is a diagram showing a mobile communications system utilizing the present invention.

With reference to FIG. 1, a mobile radio system is shown utilizing the present invention. Moreover, a number of base stations 11a–11c and mobile stations 12 are interconnected through a mobile communications network 10. It should be understood that, while only a few are shown, any number of mobile stations 12 and base stations 11a–11c may be involved. As well, the network 10 may involve any standard configurations like GSM, 3GUMTS, or IS-41. Inside the network 10 are communication links, as well as control and switching apparatus. Such apparatus controls the mobile radio system operation and delivers calls (i.e., user traffic) and signaling to the mobile stations 12 via the base stations 11a–11c. The details of this operation are well known and beyond the scope of this discussion.

The mobile stations 12 move about in the coverage area of the base stations 11a–11c and communicate with these base stations 11a–11c. These mobile stations 12 may, in turn, communicate with other mobiles (not shown) or other devices (e.g., wired telephones- not shown) attached to the network 10. The mobile radio system of FIG. 1 also includes a power control map 13, a power control process 14, and a location process 15 as parts of (or attached to) the network. The location process 15 is representative of the process that serves to determine the location of the mobile stations 12. The location process 15 may be part of the network 10, the base station controllers within the network 10, or (e.g. if it is a GPS technique) may be located in the given mobile station 12.

The power control process 14 is representative of the process that is used to control the transmitter power. For downlink transmissions, the power control process 14 may be part of the base station 11a–11c, the base station controllers within the network 10, or it may be a separate server communicating with the radio transmitters through the communications network. The power control process 14 is preferably realized in software controlling the radio transmitter operations. For the uplink, the power control process 14 is preferably part of the transmitter control process of the given mobile station 12. This may occur via software operating in either or both of the microcontroller and Digital Signal Processor (DSP) of the mobile station 12. The power control process 14 using the power control map 13 to set the power level will preferably be implemented as an addition to the otherwise existing process in the microcontroller and/or DSP in the mobile station 12 or the power control process 14 in the base station 11a–11c, the base station controllers within the network 10, or a separate server.

The power control map 13 is preferably developed via an initial survey with updating. That is to say, when the network 10 is installed, initial measurements would be taken of the power level required at each one of several practical locations throughout the coverage area. The survey results, in the form of a map or table, are then stored in the server associated with power control for the network 10 so as to form the power control map 13. Preferably, these survey results are made utilizing a two-way link at a nominal bit and error rate. The two-way link would be established, for example, between a measuring mobile station 12 and the given base station 11a–11c. Next, the location of the measurement is determined. Thereafter, the average power transmitted and received would be recorded for storage in the power control map 13 along with the corresponding location. The statistical standard deviation of the measurements related to the power transmitted and received may also be stored in the power control map 13. After such an initial survey, the power control map 13 will thus contain measurements at relatively diffuse locations in a roughly grid pattern. Greater accuracy in mapping the power control data is accomplished via updating.

According to the present invention, dynamic updating of the power control map 13 occurs as connections with mobile stations 12 are made during normal use (e.g., successful calls or data links). Preferably, each successful connection from normal use results in the power levels used (normalized to standard bit rate and error rate) along with the related location information being stored in the power control map 13. Such updating over a time period adds to the initial survey data in such a manner that required power levels for normal use in the most utilized geographic locations dynamically accrue within the power control map 13.

The power control map 13 stores the nominal (average) transmit power required, the value of the received signals, and a measure of the statistical variance of these quantities such as the standard deviation. It should be readily understood that a number of related values may also be stored for each location depending on bit and errors rates of available service. These stored values may be used as a basis for calculating the required power based on services and local conditions as discussed in the following paragraphs.

As mentioned before, the power control process 14, power control map 13, and location process 15 may be resident within the network 10 at any appropriate point. The inclusion of the power control map 13, power control process 14, and location process 15 may be possible and occur solely within the mobile station 12 as discussed with respect to FIG. 2. However, a more advantageous arrangement would be that the power control map 13 and location process 15 be independent of the power control process 14 and resident outside of the mobile station 12 as is discussed with respect to FIG. 3.

Alternatively, the power control map 13 would be held in the network 10 and be updated and shared for use by all mobile stations 12 within the network 10. The power control process 14 would involve both the mobile station transmitter and the base station receiver (or vice versa). The location process 15 may be shared between the mobile and base station or the network (e.g., GPS).

Figure 2:
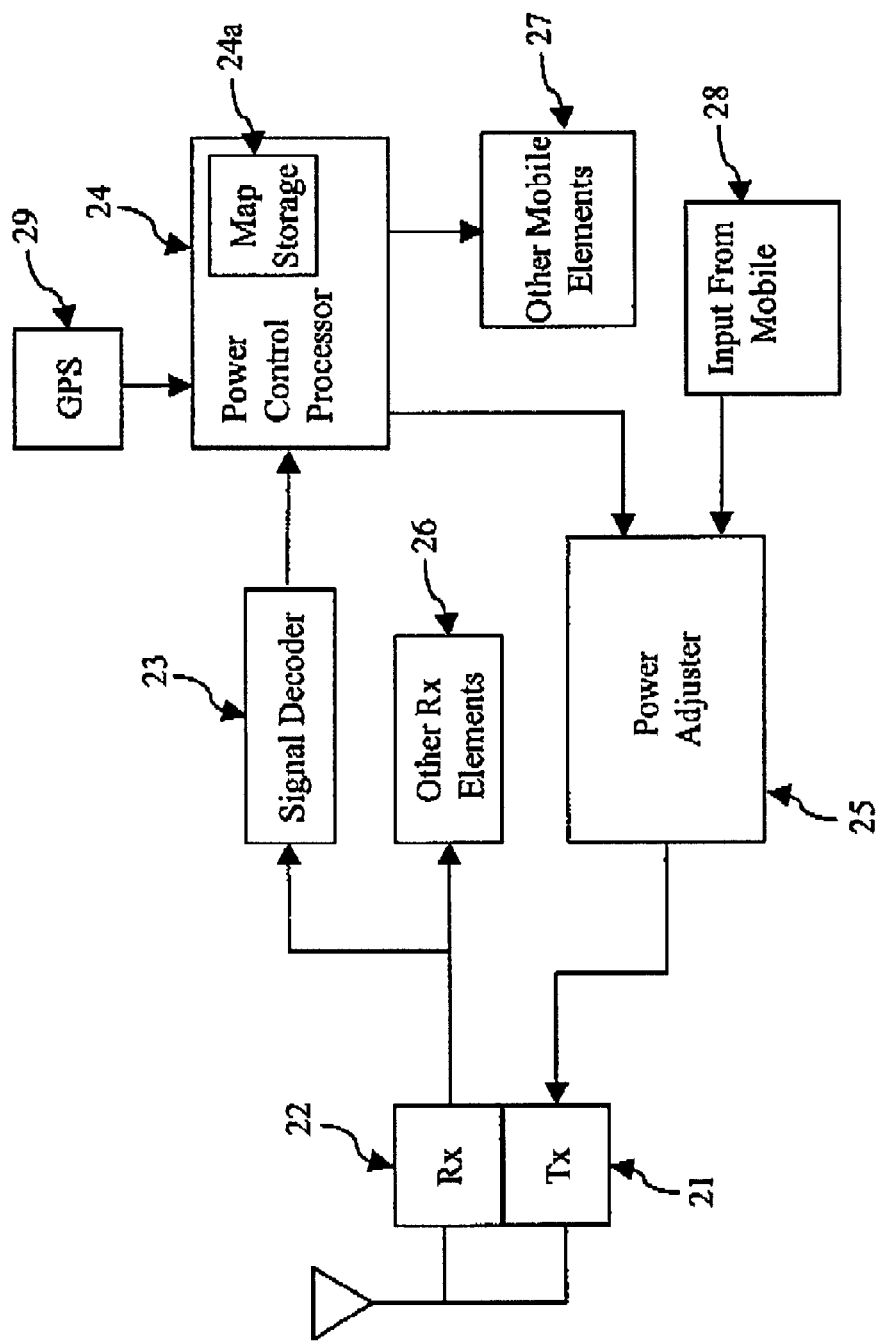
FIG. 2 is a block diagram showing a mobile station including location based power control according to the present invention.

FIG. 2 shows a block diagram of the present invention within the mobile station 12 from FIG. 1. In this arrangement, the signaling decoder 23, as well as other parts 26 of the mobile, receives and interprets the signaling messages received from the radio receiver 22 of the mobile. The signaling decoder 23 decodes the map information to be used by the power control process 24. The power control process 24 makes use of information about the location and the map/table information placed in storage 24a to adjust the power of the transmitter 21 via the transmitter power adjustment 25. There are several ways to adjust the power level that are well known. As an example, one of these is to add attenuation to reduce the signal level. Another is to reduce the voltage applied to the amplifier circuit and thereby reducing the transmitted power. The received signal and the power control process 24 are also connected to other parts of the mobile station for other control purposes 27 which are not detailed herein as they are beyond the scope of this invention. The power control process 24 may also take input 28 from other parts of the mobile station to include other operating conditions, such as the user desired bit and error rates.

In FIG. 2, the mobile is assumed to receive map and location information via the signaling decoder 23. Such information is combined in the power control process 24 to adjust the transmmiter power. It should be noted that the map information could be broadcast from the base station and stored in the power control process in the mobile while the location information could come from a GPS unit 29 in the mobile. For the mobile station to make use of the power control map information for its uplink transmissions (i.e., transmissions in the direction from the mobile station to the network base station), the map information must be made known to the mobile station.

While these elements as shown in FIG. 2 are shown as separate items, it should be understood that they would typically be a part of the software process that already is supervising the operation of the mobile station. As such, the power control map or local parts of it may be stored within the power control process 24a. Alternatively, the power control process 24 could also include software that operates from the controller of the base stations in the mobile network. In some systems, there may be several power control algorithms in effect within the processor software and some of these may also operate in the base station controller.

Within the present invention, the "nominal" values of transmitter power stored in the power control map are used as the basis for setting the transmitter power. Two important conditions affect the actual power needed for transmissions. One of these is the desired bit and error rates, and the other is the shadowing compensation. In order to maintain a desired bit and error rate, sufficient power must be transmitted to deliver enough energy per bit of data to the receiver. This must be sufficiently above the noise level for the radio modulation (and coding) technique being used to achieve the desired error rate (e.g., 4-QAM modulation requires a signal to noise ratio of about 10 dB to achieve an error rate of $10^6$ in a Gaussian channel). In modern radio systems, the subscriber may select the desired bit rate. Thus, the transmitter power will be determined by the user's needs with more power being needed for higher bit rate services. In such a situation, the nominal transmitter power values stored in the power control map might be in units of "milliwatts per bit/second." The value from the power control map would then be multiplied by the user selected bit rate to give the required transmitter power for the location and the service.

Another aspect of setting the transmitter power is the error correction coding selected. Different services selected by the user may utilize different correction techniques with some being more capable than others (to give a correct result with a higher fraction of errored bits). Accordingly, the power control map may have several nominal entries with one for each of the available coding techniques.

Adjustment is also needed for the target error rate with low error rates (i.e., fewer errors desired) requiring higher powers than for allowed higher error rates (i.e., more errors accepted). The correction for the selected error rate may be by means of an offset for the error rate. For example, a 1 dB reduction in power for each factor of 10 allowed increase in error rate may be appropriate. Alternatively, the correction for the selected error rate may be by means of multiple entries in the map for selected error rates. The user's selected bit rate and desired maximum error rate is often referred to as the Quality of Service (QoS). While the QoS typically also includes a measure of the delay in transmission, that is not particularly utilized within the present invention.

The power control values retrieved from the power control map corresponding to the mobile's given location may also be corrected for the fading or shadowing conditions at the time of operation. To do this, the received signal strength may be compared with that in the map. The difference between these two values may then be used to adjust the transmitter power. Thus, if the received signal strength is less than the recorded value in the power control map by, for example, 3 dB, then the transmitter power would be increased by 3 dB above the value from the power control map (adjusted for the bit rate). Alternatively, if the received power was, for example, 5 dB higher, then the transmitter power could be reduced by 5 dB from the value from the power control map.

Figure 3:
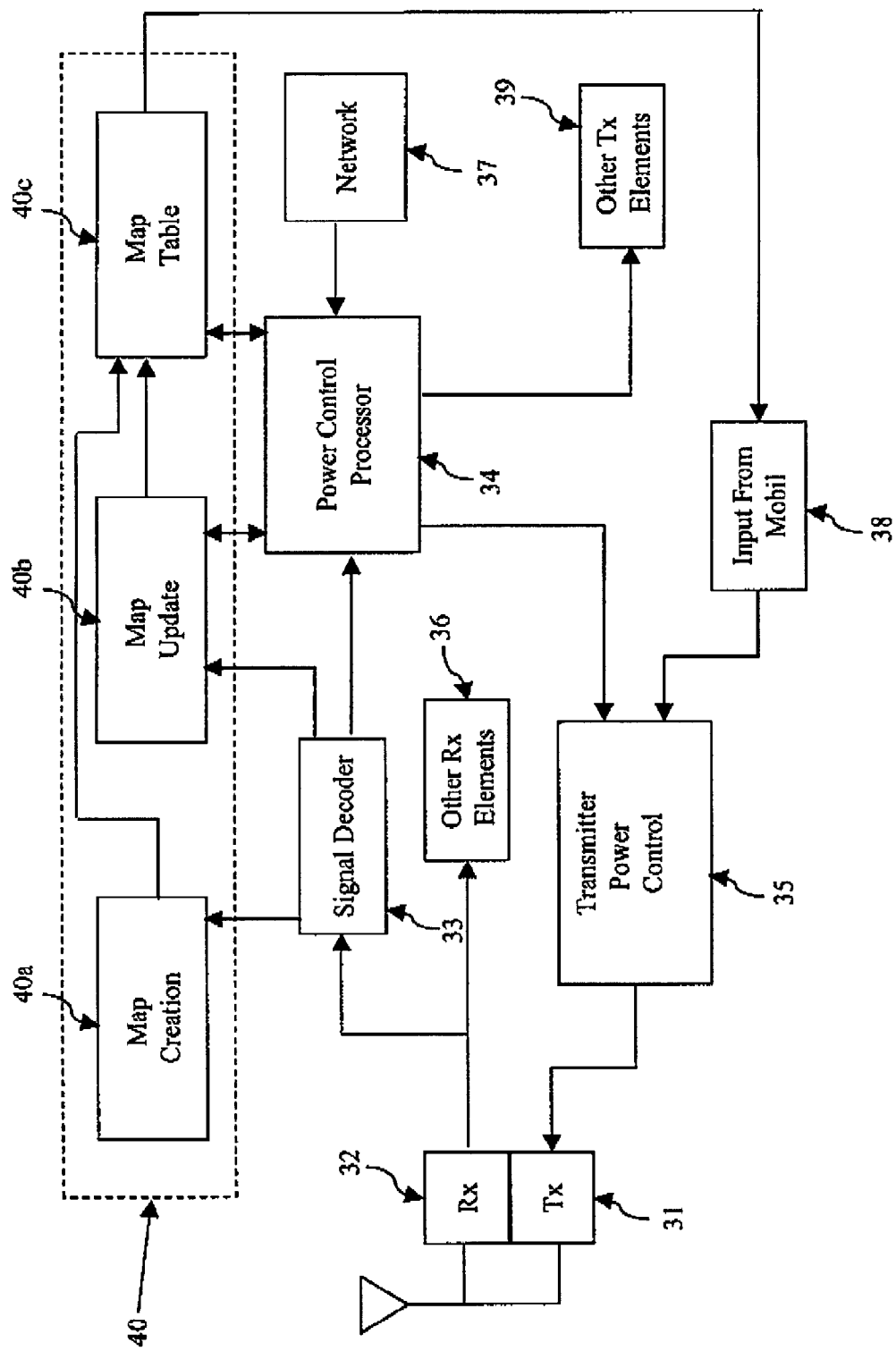
FIG. 3 is a block diagram showing a base station including location based power control according to the present invention

As shown in FIG. 3, the base station may make use of the power control map information for transmissions from the base station to the mobile through the base station's power control process 40. The network side power control process (typically in the base station) may query the information stored locally in the base station or in another network side server for the needed location and power information.

The location based power control in FIG. 3 shows location information utilized within the base station 40 and the network side 37. The signals from the other stations (either fixed or mobile) are received and transmitted through the radio transmitter 31 and receiver 32 from the antenna. The received signals are demodulated and passed to the other parts 36 of the receiver which are not part of this discussion (such parts may include, for example, call processing signaling, speech and data from the mobile terminal). The signaling decoder 33 decodes the signaling information related to the power control. That information which relates to the control of the transmissions to the currently addressed mobile is passed to the power control process 34 where the appropriate parameters for the transmission are determined. These parameters may include the power level, the modulation, the coding, and the symbol rate.

The power control process 34 makes use of the power control map information to assist in determining the appropriate power and other transmission parameters for the communications. The location information received from the mobile, or another location process, is used by the power control process 34 to access the power control map 40c stored at the base station 40. For example, if the power control map was stored in memory at the base station 40 as a table, then the location information may be used as an index to "look-up" the appropriate information in the table. After suitable calculation by the power control process 34, a set of power control parameters for the transmitter is developed. These parameters are passed to other parts 39 of the transmitter for use in preparing transmissions. The transmitter power control information, for example, is passed to the power control apparatus section 35 of the transmitter and used to set the transmission level. The parameters for coding, modulation and symbol rate are passed to other parts of the transmitter where they select these functions within the transmitter to form the speech or data transmitted stream. After adjustment for power level, the radio transmitter 31 transmits the data. These elements are typically part of the base station of a mobile (or fixed) radio communications system. The functions illustrated for the power control process would typically be added as software increments to existing software process within the base station overall control and monitoring process (software).

Making the map information known to the mobile station may be accomplished in several ways. One way is for the base station to broadcast the map information as part of its broadcast signaling. Such broadcast signaling is part of the radio system operation and typically includes information about the system operator, preferred channels, and available services. The power control map information could be included as part of these general broadcasts. The mobile station would receive such broadcasts. The relevant values could then be stored locally for use in the uplink power control. Alternatively, the mobile station could make use of the radio system signaling channels to advise the power control process in the network of the mobile station's location and to request the values suitable for the location. This latter method has the advantage that less information need be included in the broadcast channel, although it would require some signaling to the individual mobile station.

Some of the signaling received at the base station may relate to updating of the power control map information. The mobile terminal may signal with its location and its (successful) power level and other modulation parameters. This information is passed to the power control map update process 40b. This process may adjust the power control map information 40c for the indicated location. This may mean adding a new entry in the table if the mobile terminal is at a previously non-surveyed location. Alternatively, if the location is between two or more entries in the table, the new measure may be used to adjust the nearest values in the table. Typically, the adjustment of the entries would be made in proportion to the proximity of the location to the table entry. Table entries nearest the measurement location would be more influenced by the new measurement ("weighted more") than those furthest away. If the mobile is at or near (within a few meters of) a previously surveyed location, then the power control map update process may adjust the table location with the new measurements. While the new information could simply replace the previous information in the power control map, the new measurements may otherwise be averaged with the old in a moving average process. In a moving average process, the last number of measurements (e.g., 5) may be maintained and averaged as the table entry. When a new measurement is received, the oldest measurement is discarded and the previous four and the new measurements are averaged to form the table entry. As the base station may also be adjusting its power and transmission parameters based on the locations of mobile terminals it is serving, the power control process 34 in the base station may also provide power control map update information to the power control map update control process 40b.

The power control map 40c may be created in a number of ways. One of the simplest is to survey, as mentioned above, the coverage area of the radio system. A measurement and reporting transceiver would be moved about the coverage region and at intervals it would report its location and transmitter parameters (power level, modulation type, coding, symbol rate, and standard deviation of measurements). These measures would be signaled back to the serving base station receiver 32 for communication to the map creation process 40a which would create and enter the measurements in the power control map table 40c. To update the power control map, the mobile would report its power parameters via receiver 32 and signaling decoder 33 to the map update process 40b. This process would then update or modify the power control map table 40c with the new measurements.

Note that in the process described above, if the mobile reports from a non-surveyed location then a new table entry may be created. In this case, the map creation process 40a and the map update process 40b are nearly the same. The map creation process 40a being the part of creating the initial power control map 40c and filling in the first entries and the map update process 40*b* being the part of updating entries or creating new ones. (In the creation process, for example, there may be no previous existing measurements with which to form a moving average.)

During the initial survey, the measurement and reporting transceiver may be placed at convenient locations throughout the coverage area. To assure that all locations are measured and map coverage is complete, a grid of survey locations may be used to cover the area. For typical suburban area, a spacing of about 100 meters between grid lines may be used. For rural cells, a spacing of 500 meters would be appropriate. For an urban cell, with a high density of buildings and other obstructions, a survey location on each street at about a 50-meter spacing would be appropriate. The measurement and reporting transceiver could be simply a "normal" mobile terminal that may be controlled to make a measurement report (of power parameters and location) at the request of the operator (or automatically as the operator drives about the survey region). The reports may be made simply by making a "data call" to the map creation process and reporting the measurement numbers. The survey technique covers the whole area (in a grid pattern) and thus assures complete coverage. The update process 40*b*, because it is based on reports from mobile terminals actually using the system assures table-map information is available from the locations that are actually used by the mobile radio system customers.

In operation with high-speed packet data services such as in third generation (3G) systems, location information becomes a much more important part of the power control process. In packet transmissions, a transmitted burst may be too short for the power control feedback loop to activate and lock. In addition, the packet flow may be one-way. Under these one-way traffic conditions with short bursts, the power levels may be set based on the location. The levels may be derived from the computed range and path loss, or set based on previous performance from the location using a stored map as mentioned previously. Using this location-based power control technique obviates the need for a return channel to handle the power control commands (for what would otherwise be one-way flows). This usage of the location power control method permits the handling of short one-way packet flows with minimum radio system resources. As well, the location power control method is applicable for both uplink and downlink transmissions (i.e., transmissions in the direction from the network base station to the mobile station).

Another preferred aspect of the present invention (when there is typically a two-way feedback loop controlling the power levels) is to limit the maximum power to be used. Sometimes the transmission link experiences a momentary "deep fade" in which the received signal quickly disappears almost to nothing although the signal will typically reappear at a workable level a few milliseconds thereafter. In such deep fading, the typical feedback control loop will increase the transmit power as much as possible (up to the limit of the capability of the transmitter) to try to compensate for this fade. Unfortunately, the increase in power will typically be insufficient to prevent errors on the link. However, the use of the maximum power contributes extra noise and interference to other radio links in the area. Under these conditions, the present invention substantially eliminates such system degradation.

The present invention enables control over the active power control process to balance the error rate on the active link with the interference to other calls. If, for example, the mobile is experiencing a transitory deep fade, increasing its transmit power to the maximum may not be sufficient to maintain the link, yet will cause much interference to other calls. It may be preferable to have temporary errors on one link in order to minimize the interference to others. The location information can be used as part of this balancing process to limit the maximum range of the power control process. This is accomplished by using the standard deviation observed in the measurements, and setting a limit of the maximum power allowed as (say) a level that is no more than 2 standard deviations above the nominal value for the location of the mobile station. This will have the effect of limiting the interference to other services while allowing flexibility in the power control process operation. This limit would be applied whenever the power control process reaches a threshold based on the user's requested QoS, and the sensitivity of other traffic to interference.

Figure 4:
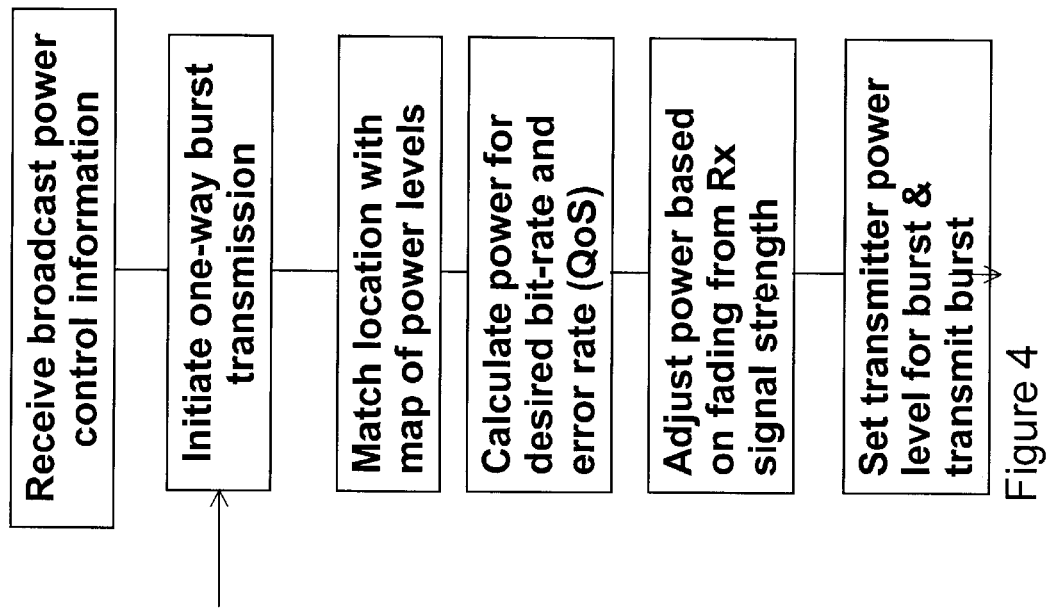
FIG. 4 is a flow diagram showing the power adjustment process according to the present invention.

FIG. 4 shows the steps used within the remote terminal (mobile or fixed) for the location based power control of the present invention. Specifically, the steps include: 1) receiving the broadcast power control information (e.g., the map entries for the local area which may be stored in the power control process for later use; 2) initiating a one-way burst transmission; 3) matching the location with the corresponding entry within the power control map; 4) calculating the power for the desired bit-rate and error rate (i.e., QoS); 5) adjusting the power based on fading from Rx signal strength; and 6) setting the transmitter power level for burst and sending the transmission burst.

The process controlling the power first receives the power control map information giving the nominal power levels for the area of the mobile station. When the transmitter needs to send a one-way burst transmission, it first determines the mobile station's location and matches that with the map/table information. The process then calculates the power needed based on the user desired bit and error rate (QoS). The process further calculates the power needed based on the received signal strength to compensate for fading. If there is no current received signal, which might be typical for one-way transmissions, then the process would make only a nominal adjustment for fading (e.g., the power may be increased by one half the standard deviation of the map entry for the given location to allow for nominal fading). After calculating the appropriate transmitter power, the process sets the transmitter apparatus to this level and begins to transmit the burst. This process may be repeated for each burst to be transmitted. The previously determined power value can be reused if the location has not changed.

In operation, the present invention uses location to set power control for uplink and/or downlink. Location is also utilized for initial access (i.e., access channel). Further, a power control map of previously good values is maintained-preferably in the base station-and broadcast so as to enable the mobiles within the coverage area to set their levels. The broadcast values of the power control map are adjusted by the transmitter (either in the base station or the mobile) based on several factors. Such factors including, but not limited to, received signal strength, the bit rate (i.e., bandwidth) for the service, and the desired error rate (and error control coding). Storage and broadcasting of the mobile received power levels is also useful such that the mobiles can compare their received power level with the nominal value and adjust for shadowing. One-way packet data service without the need for a reverse channel for the power control feedback is possible as is the technique of not correcting with the feedback power control for deep fades (based on location) to avoid interference to other users.

Figure 5:
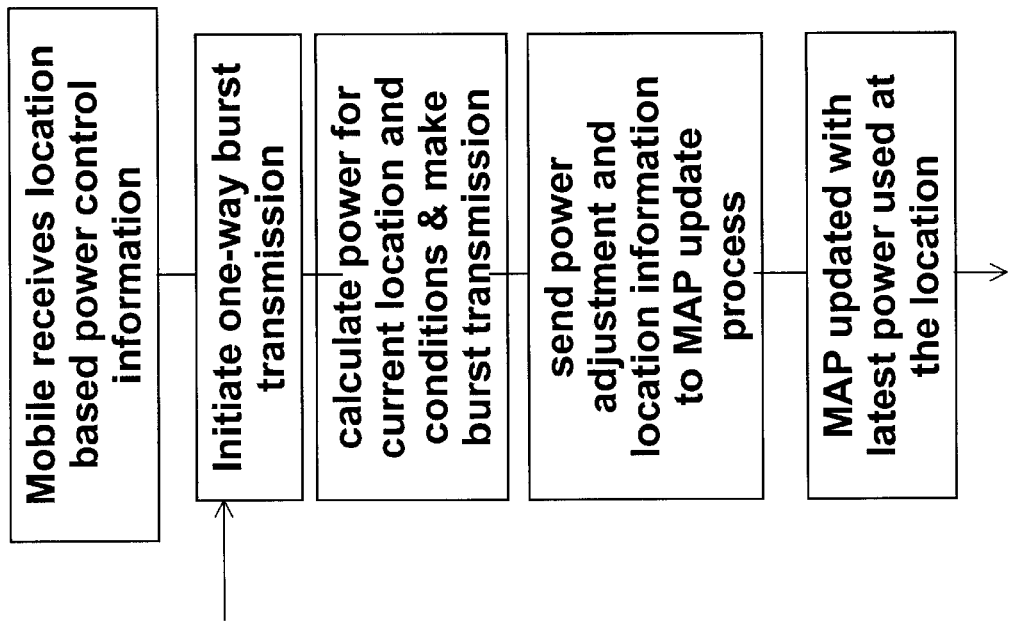
FIG. 5 is a flow diagram showing the map update process according to the present invention.

A FIG. 5 shows the steps within the process for updating the map information of the present invention. Such steps include: 1) receiving location based power control information at the mobile; 2) initiating a one-way burst transmission; 3) calculating the power for the current location and conditions of the mobile and matching the transmission; 4) sending power adjustment and location information to the map update process; and 5) updating the power control map with the current power used at the instant location.

The preferred embodiment of the present invention was described in terms of utilizing geographical location information for power control. However, it should be recognized that geographical location information might be similarly utilized within the inventive method for other desirable uses without straying from the intended scope of the invention. Persons skilled in the art will appreciate that there are yet more alternative implementations and modifications possible for implementing the present invention, and that the above implementation is only an illustration of this embodiment of the invention. Accordingly, the scope of the invention is intended only to be limited by the claims included herein.

I claim:

1. A method for location-based power control within a packet-based mobile radio communications system, said method comprising:

receiving broadcast power control information on a mobile side of said packet-based mobile radio communications system, said broadcast power control information including a predetermined transmit power level;

transmitting, at said predetermined transmit power level, a first one-way packet transmission from said mobile side to a network side of said packet-based mobile radio communications system, said first one-way packet transmission including a location data object being a geographical location that corresponds to a portion of a packet-based mobile radio communications coverage area:

receiving said location data object on said network side;

matching said location data object to a corresponding power value data object within a power control map of power value data objects; and in advance of a second one-way packet transmission, re-setting said predetermined transmit power level to said corresponding power value data object.

2. The method as claimed in claim 1 wherein said re-setting further includes, setting said corresponding power value according to a suitable bit rate and QoS, and setting said corresponding power value to compensate for fading.

3. The method as claimed in claim 2, said method further including updating said power control map to include said corresponding power value related to said suitable bit rate and QoS and compensating for fading.

* * * * *